United States Patent
Robinson et al.

(10) Patent No.: US 10,663,028 B2
(45) Date of Patent: May 26, 2020

(54) TUNABLE HYDRAULIC VIBRATION DAMPING MOUNT

(71) Applicant: Boge Rubber & Plastics USA, LLC, Hebron, KY (US)

(72) Inventors: Christopher Robinson, Independence, KY (US); Michael Allen Sewell, Burlington, KY (US)

(73) Assignee: Boge Rubber & Plastics USA, LLC, Hebron, KY (US)

( * ) Notice: Subject to any disclaimer, the term of this patent is extended or adjusted under 35 U.S.C. 154(b) by 0 days.

(21) Appl. No.: 16/101,094

(22) Filed: Aug. 10, 2018

(65) Prior Publication Data

US 2020/0049225 A1    Feb. 13, 2020

(51) Int. Cl.
| | |
|---|---|
| *F16F 9/10* | (2006.01) |
| *F16F 13/14* | (2006.01) |
| *B60G 13/00* | (2006.01) |
| *B62D 24/02* | (2006.01) |

(52) U.S. Cl.
CPC ............ *F16F 13/14* (2013.01); *B60G 13/003* (2013.01); *B62D 24/02* (2013.01); *B60G 2204/128* (2013.01)

(58) Field of Classification Search
CPC .. F16F 13/08; F16F 13/16; F16F 13/30; F16F 13/107
USPC ................. 267/140.11–140.15, 140.2–140.5, 267/141.1–141.7
See application file for complete search history.

(56) References Cited

U.S. PATENT DOCUMENTS

| | | | | |
|---|---|---|---|---|
| 4,277,056 A | * | 7/1981 | Ticks ...................... | F16F 13/08 267/140.13 |
| 4,733,758 A | * | 3/1988 | Duclos .................... | F16F 13/30 188/267.1 |
| 4,909,490 A | * | 3/1990 | de Fontenay ......... | F16F 13/107 138/30 |
| 4,936,557 A | * | 6/1990 | Schwerdt ................ | F16F 13/14 267/140.12 |
| 5,197,692 A | * | 3/1993 | Jones ...................... | B64D 27/18 188/320 |
| 8,091,871 B2 | * | 1/2012 | Bradshaw ................ | F16F 13/16 267/140.13 |
| 8,196,911 B2 | * | 6/2012 | Baumbarger ........... | F16F 1/387 267/141.2 |
| 8,240,641 B2 | * | 8/2012 | McGuire ................ | B64D 27/26 267/33 |
| 9,038,997 B2 | | 5/2015 | Bradshaw et al. | |

(Continued)

*Primary Examiner* — Christopher P Schwartz
(74) *Attorney, Agent, or Firm* — Wood Herron & Evans LLP (57) ABSTRACT

A tunable hydraulic vibration damping mount comprises a universal outer housing, inner sleeve, main spring assembly, bottom compliance assembly, and inner bushing. Each of a plurality of flow channel members comprises a cylinder having a common inner diameter, a common outer diameter, and a helical track having a cross-sectional area and a length defining a volume of the helical track. The helical track of each flow channel member defines a different volume. A selected flow channel member is positioned between the inner bushing and the outer housing and between the main spring assembly and the bottom compliance assembly. The selected flow channel member provides a selected dynamic performance of the damping mount.

22 Claims, 6 Drawing Sheets

(56) References Cited

U.S. PATENT DOCUMENTS 9,765,845 B2 9/2017 Bradshaw et al.
2018/0180135 A1 6/2018 Nydam

* cited by examiner

TUNABLE HYDRAULIC VIBRATION DAMPING MOUNT

RELATED APPLICATIONS

N/A.

FIELD OF THE INVENTION

This invention relates generally to hydraulic vibration damping mounts, and more particularly to tunable hydraulic vibration damping mounts for mounting a vehicle body to a vehicle frame.

BACKGROUND OF THE INVENTION

Hydraulic vibration damping mounts or so-called "hydro mounts" are known in the art. One application of a hydro mount is to damp vibrations from a vehicle frame transmitted to a vehicle body. Such a hydro mount may include a rubber bushing in combination with fluid moving between two fluid chambers. Examples of such a hydro mount are shown in U.S. Pat. Nos. 8,091,871, 9,038,997, and 9,765,845, assigned on their faces to Cooper-Standard Automotive, Inc., and US Patent Publication No. 2018/0180135, assigned on its face to Nissan North America, Inc.

It is desirable to reduce the size and weight of current hydro mounts.

It is also desirable to improve the axial and radial performance of current hydro mounts.

It is further desirable to provide a tunable hydro mount that provides for a selectable dynamic performance range within a standard or universal physical envelope of the hydro mount.

SUMMARY OF THE INVENTION

In one aspect, a tunable hydraulic vibration damping mount comprises a universal outer housing, a universal inner sleeve, a universal main spring assembly positioned at an upper end of the outer housing for pumping fluid through the mount, a universal bottom compliance assembly positioned at a lower end of the outer housing for allowing expansion during fluid flow when the main spring assembly is compressed, a universal inner bushing extending radially outwardly from the inner sleeve, and a plurality of fluid flow channel members. Each of the plurality of flow channel members comprises a cylinder having a common inner diameter, a common outer diameter, and a helical track formed therein having a cross-sectional area and a length defining a volume of the helical track. Each helical track of each of the plurality of flow channel members defines a different volume. A selected one of the plurality of flow channel members is positioned between the inner bushing and the outer housing and between the main spring assembly and the bottom compliance assembly. The selected flow channel member provides a selected dynamic performance of the damping mount.

The selected dynamic performance can be based upon a maximum dynamic stiffness at a maximum dynamic stiffness frequency and a maximum loss angle at a maximum loss angle frequency. The maximum dynamic stiffness can range from about 3,000 N/mm to about 3,200 N/mm at a frequency range of about 12 Hz to about 18 Hz, and the maximum loss angle can range from about 100 degrees to about 110 degrees at a frequency range of about 12 Hz to about 18 Hz.

The inner sleeve can be fabricated of steel and the inner bushing can be fabricated of rubber and be molded to the inner sleeve. The inner bushing can include one or more thicker or thinner sections, a durometer of the rubber and a geometry of the thicker or thinner sections being selected so as to provide selected fore-and-aft and side-to-side radial stiffnesses of the damping mount. The inner bushing can include an outer plastic sleeve, with the inner bushing being molded to the outer plastic sleeve, and with a radial outer surface of the outer plastic sleeve abutting a radial inner surface of the selected flow channel member.

The damping mount can further include a rubber seal positioned at an upper end of the selected flow channel member to seal the selected flow channel member and permit fluid flow from a reservoir of the main spring assembly to the helical track of the selected flow channel member.

The damping mount can further include an upper washer positioned at an upper end of the inner sleeve, and a lower washer positioned at a lower end of the inner sleeve. The washers can be fabricated of steel.

The main spring assembly can comprise an inner die cast aluminum member, a steel bottom plate, and a rubber body molded to the aluminum member and the bottom plate.

The outer housing can be fabricated of steel and can comprise a cylinder having a flange at an upper end of the cylinder. The bottom plate of the main spring assembly can abut the flange. The flange and bottom plate can have aligned holes therethrough, and fasteners can be pressed into the holes and be adapted to secure the damping mount to a vehicle frame.

The plurality of flow channel members can be fabricated of nylon.

The bottom compliance assembly can comprise an inner plastic sleeve, an outer steel flange, and a rubber bellows molded to the inner plastic sleeve and the outer steel flange.

In another aspect, a method of tuning a hydraulic vibration damping mount comprises providing a universal outer housing, providing a universal inner sleeve, providing a universal main spring assembly, providing a universal bottom compliance assembly, providing a universal inner bushing, and providing a plurality of fluid flow channel members. Each of the plurality of flow channel members comprises a cylinder having a common inner diameter, a common outer diameter, and a helical track formed therein having a cross-sectional area and a length defining a volume of the helical track, with each helical track of each of the plurality of flow channel members defining a different volume. The method further comprises selecting a flow channel member from the plurality of flow channel members that provides a selected dynamic performance of the damping mount, and assembling the outer housing, inner sleeve, main spring assembly, bottom compliance assembly, inner bushing, and selected flow channel member.

The step of assembling the outer housing, inner sleeve, main spring assembly, bottom compliance assembly, inner bushing, and selected flow channel member can comprise molding the inner bushing on the inner sleeve, pressing an upper end of the inner sleeve into the main spring assembly, affixing the inner sleeve and the main spring assembly to the outer housing, pressing a seal into the outer housing, pressing the selected flow channel member into the outer housing below the seal, pressing the bottom compliance assembly onto a lower end of the inner sleeve, swedging a lower end of the outer housing to the bottom compliance assembly, filling the damping mount through a port in the main spring assembly with fluid, pressing an upper washer onto the upper end of the inner sleeve, pressing a lower washer onto the lower end of the inner sleeve, and pressing fasteners through aligned holes in a bottom plate of the main spring assembly and in an upper flange of the inner sleeve.

In another aspect, a tunable hydraulic vibration damping mount comprises an outer housing, an inner sleeve, a main spring assembly positioned at an upper end of the outer housing for pumping fluid through the mount, a bottom compliance assembly positioned at a lower end of the outer housing for allowing expansion during fluid flow when the main spring assembly is compressed, an inner bushing extending radially outwardly from the inner sleeve, and a plurality of fluid flow channel members. Each of the plurality of flow channel members comprises a cylinder having a common inner diameter, a common outer diameter, and a track formed therein having a cross-sectional area and a length defining a volume of the track. Each track of each of the plurality of flow channel members defines a different volume. A selected one of the plurality of flow channel members is positioned between the inner bushing and the outer housing and between the main spring assembly and the bottom compliance assembly. The selected flow channel member provides a selected dynamic performance of the damping mount.

In another aspect, a method of tuning a hydraulic vibration damping mount comprises providing an outer housing, providing an inner sleeve, providing a main spring assembly, providing a bottom compliance assembly, providing an inner bushing, and providing a plurality of fluid flow channel members. Each of the plurality of flow channel members comprises a cylinder having a common inner diameter, a common outer diameter, and a track formed therein having a cross-sectional area and a length defining a volume of the track, with each track of each of the plurality of flow channel members defining a different volume. The method further comprises selecting a flow channel member from the plurality of flow channel members that provides a selected dynamic performance of the damping mount, and assembling the outer housing, inner sleeve, main spring assembly, bottom compliance assembly, inner bushing, and selected flow channel member.

The selected dynamic performance can be based upon the dynamic stiffness and the loss angle. The track can be helical.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
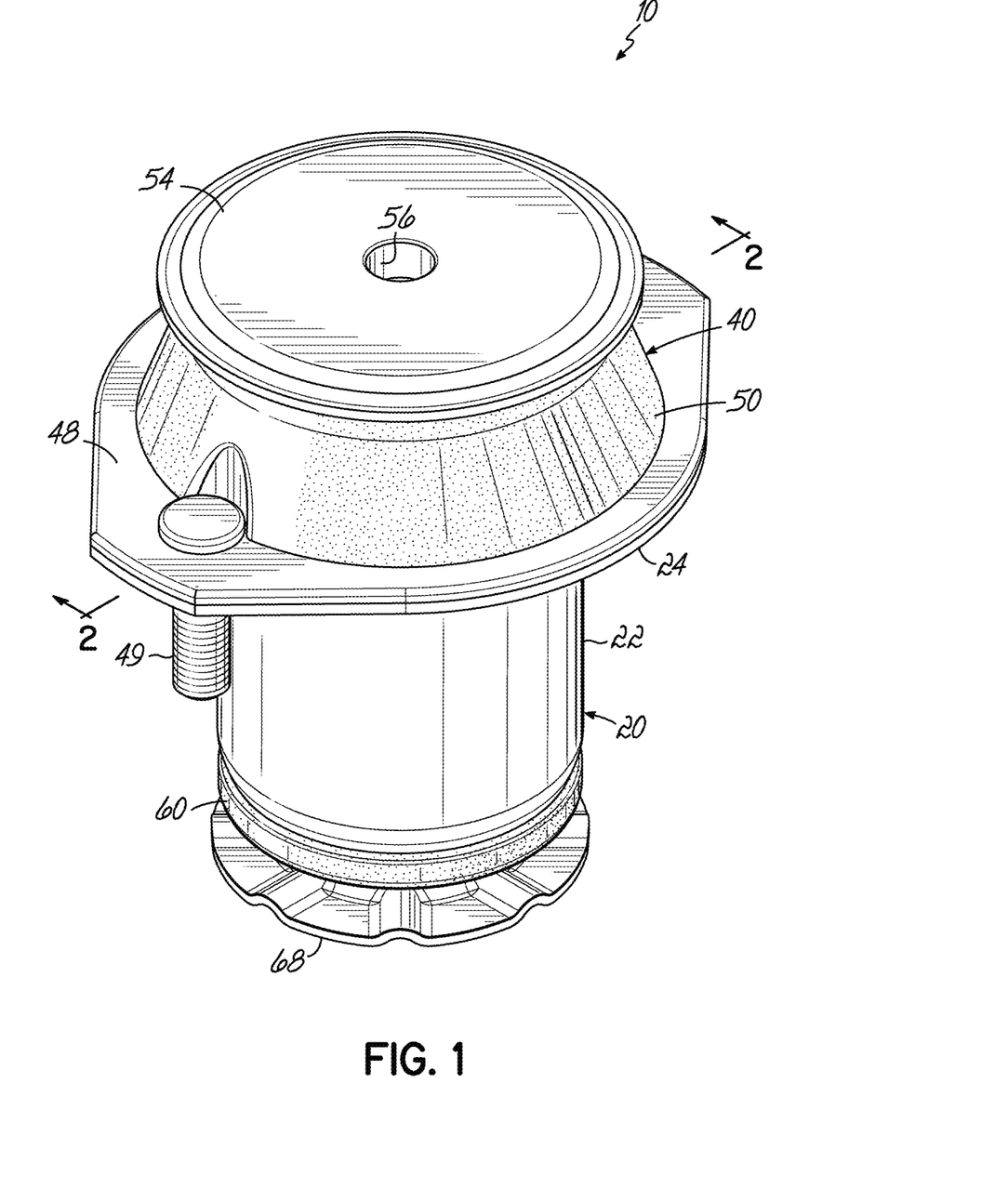
FIG. 1 is a perspective view of the hydraulic vibration damping mount.
Figure 2:
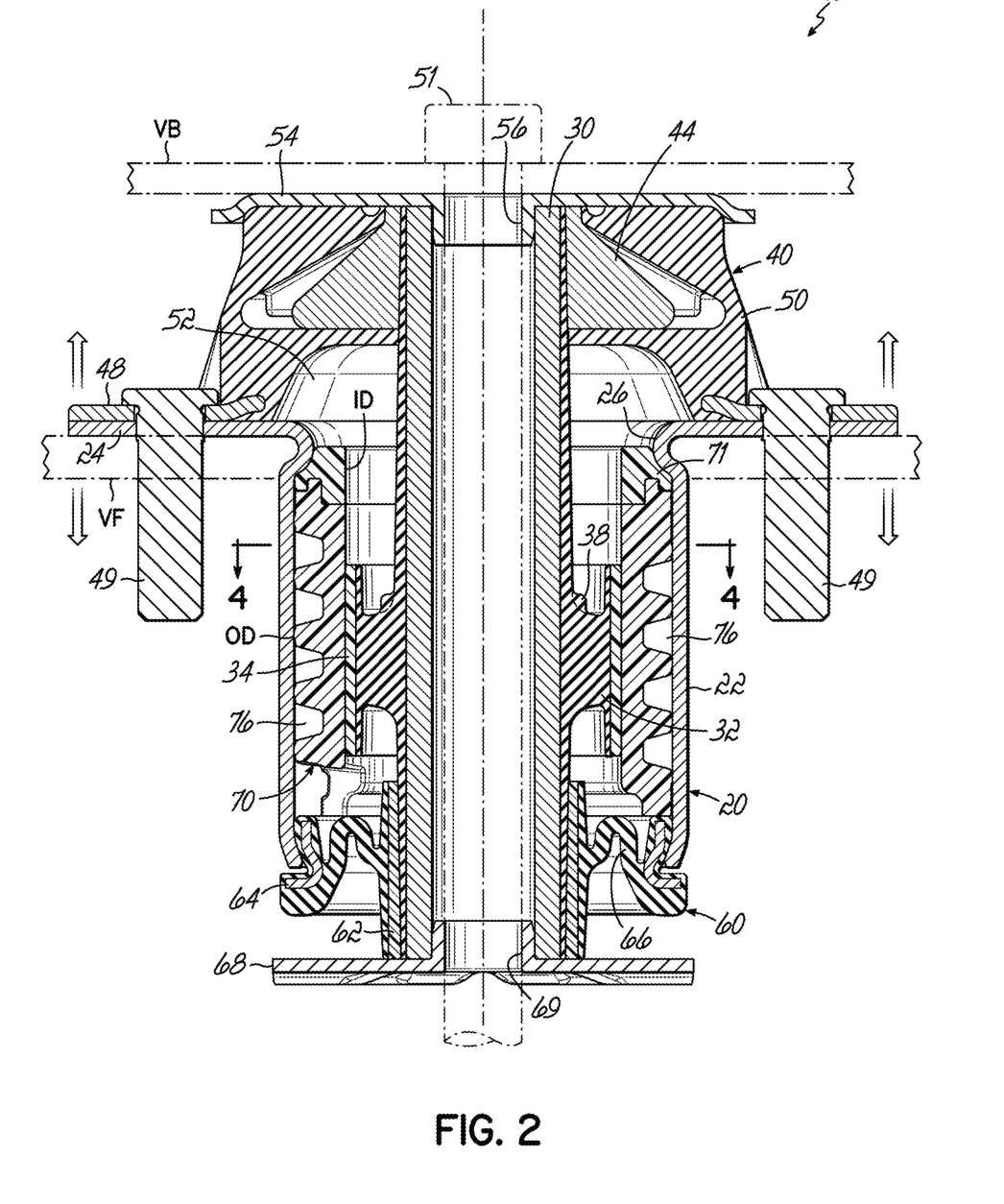
FIG. 2 is a cross-sectional view taken along line 2-2 in FIG. 1.
Figure 3:
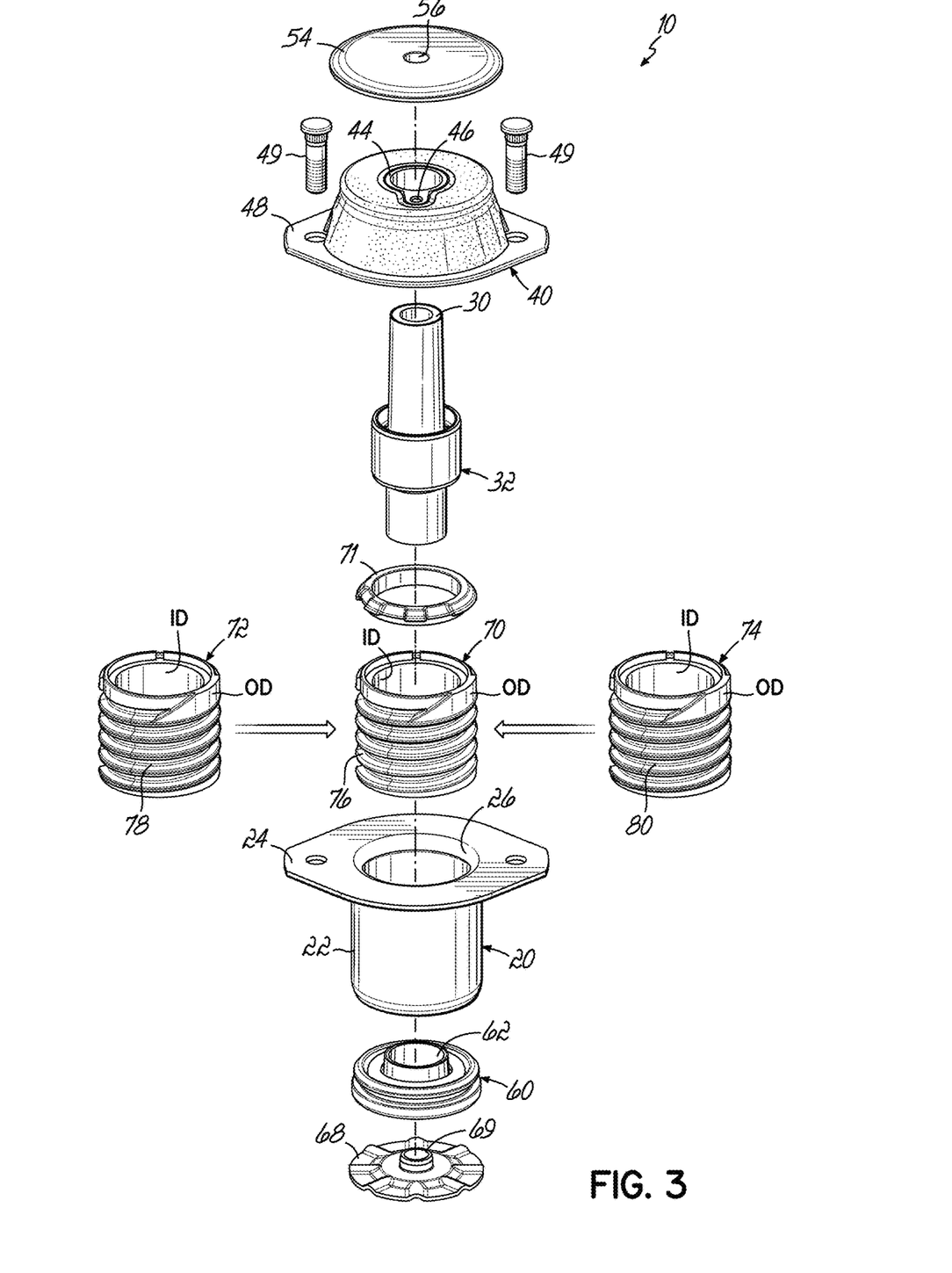
FIG. 3 is an exploded perspective view of the hydraulic vibration damping mount of FIGS. 1 and 2.

Referring to first to FIGS. 1-3, there is illustrated a hydraulic vibration damping mount 10 embodying the principles of the present invention. The mount 10 has a deep drawn steel outer housing 20 having a cylindrical portion 22, a flange portion 24 at an upper end of the cylindrical portion 22, and a return or shoulder 26 at the juncture of the cylindrical portion 22 and flange portion 24.

Figure 4:
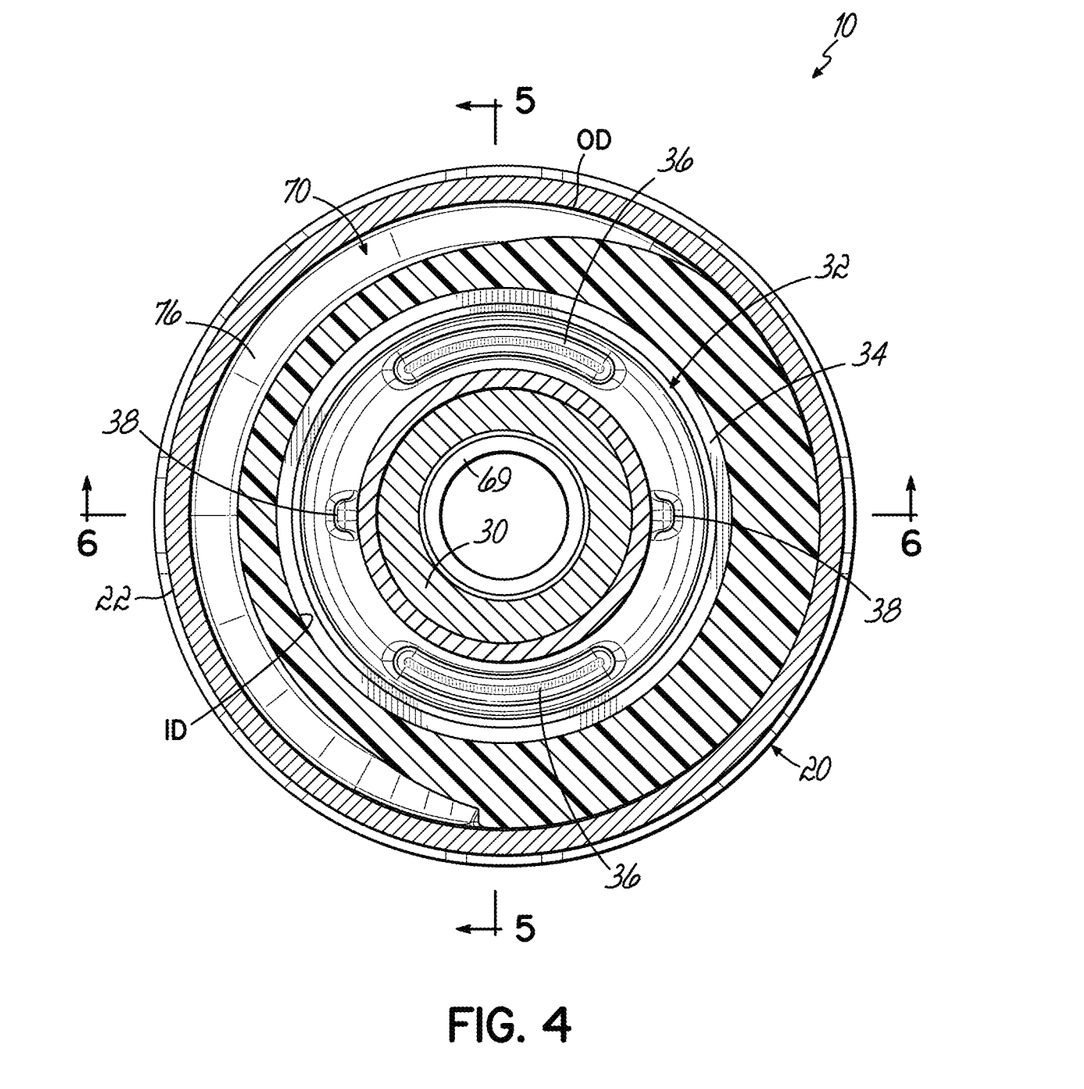
FIG. 4 is a cross-sectional view taken along line 4-4 in FIG. 2.
Figure 5:
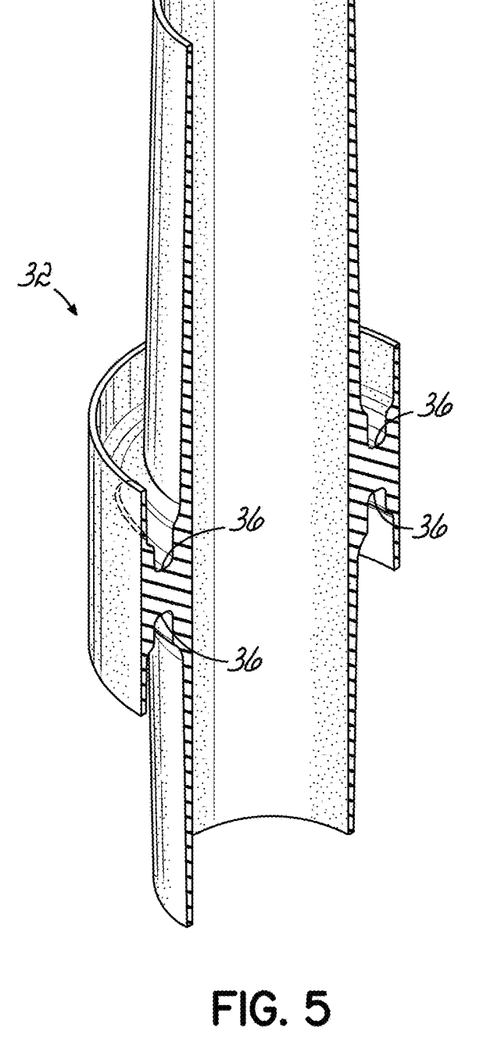
FIG. 5 is a cross-sectional view of the inner bushing taken along line 5-5 in FIG. 4.
Figure 6:
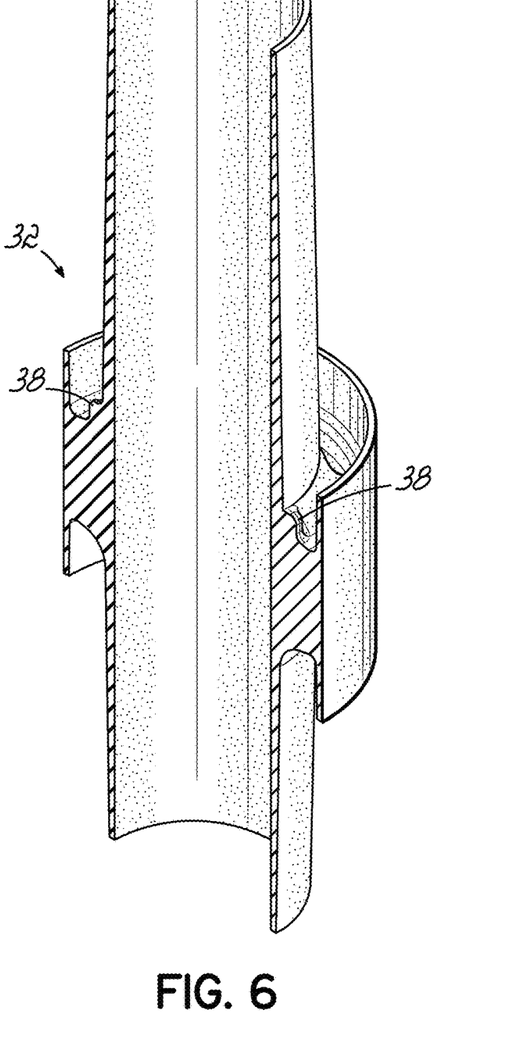
FIG. 6 is a cross-sectional view of the inner bushing taken along line 6-6 in FIG. 4.

The mount 10 further has an inner sleeve 30 which is a steel cylindrical tube. The inner sleeve 30 could also be fabricated of aluminum, as well as possibly plastic. A rubber inner bushing 32 is molded to the inner sleeve 30. The inner bushing 32 is also molded to an outer plastic sleeve 34. The geometry of the inner bushing 32 and the durometer of the rubber used for the inner bushing 32 can be selected so as to provide selected vehicle fore-and-aft and vehicle side-to-side ("cross-car") radial static stiffnesses of the damping mount 10. For example, and referring to FIGS. 4-6, the inner bushing 32 can include one or more longer arcuate thinner sections 36 disposed on diametrically opposite sides of the bushing 32 and one or more shorter thicker sections 38 disposed on diametrically opposite sides of the bushing 32 and oriented at 90 degrees relative to the sections 36. Such an arrangement provides a selected vehicle side-to-side static stiffness and a different selected vehicle fore-and-aft static stiffness, respectively.

A main spring assembly 40 is positioned at an upper end of the outer housing 20 and has an inner die cast aluminum member 44 with a fluid fill port 46, a steel bottom plate 48, and a rubber body 50 molded to the aluminum member 44 and the bottom plate 48. The inner member 44 could be fabricated of materials other than aluminum. The geometry of the rubber body 50 and the durometer of the rubber used for the body 50 can be selected so as to provide a selected axial (vertical) static stiffness of the damping mount 10. The main spring assembly 40 defines a fluid reservoir 52 and pumps fluid through the mount 10 when the main spring assembly 40 compressed. The bottom plate 48 of the main spring assembly 40 is affixed to the flange 24 of the outer housing 20 by, for example, riveting or the like. A steel upper washer 54 has a collar 56 that is pressed into an upper end of the inner sleeve 30. The upper washer 54 will be in contact with the vehicle body VB, and will distribute loads between the mount 10 and the vehicle body VB. Fasteners 49 are pressed into aligned holes in the bottom plate 48 and flange 24 to secure the mount 10 to the vehicle frame VF. Fastener 51 passes through inner cylinder 30 to secure the mount 10 to the vehicle body VB. Alternatively, fasteners 49 could secure the mount 10 to the vehicle body VB and fastener 51 could secure the mount 10 to the vehicle frame VF.

A bottom compliance assembly 60 is positioned at a lower end of the outer housing 20 and allows bellows-like expansion during fluid flow when the main spring assembly 40 is compressed. The bottom compliance assembly 60 has an inner plastic sleeve 62, an outer steel flange 64, and a rubber bellows 66 molded to the plastic sleeve 62 and steel flange 64. A steel lower washer 68 has a collar 69 that is pressed into a lower end of the inner sleeve 30. The lower washer 68 acts as a hard stop against the bottom compliance assembly 60 during upward travel of the lower washer 68 to prevent over travel.

A plurality of fluid flow channel members 70, 72, and 74 are provided. While three flow channel members 70, 72, and 74 are illustrated, more or less could be utilized in the practice of the present invention. As shown in FIG. 2, flow channel member 70 has been selected for installation into the mount 10. A seal 71 is positioned between the upper end of the flow channel member 70 and the return 26 of the outer housing 20 to seal the flow channel member 70 and permit fluid flow from the reservoir 52 of the main spring assembly 40 to and through the selected flow channel member 70.

Each of the plurality of flow channel members 70, 72, and 74 comprises a cylinder having a common inner diameter ID and a common outer diameter OD. The flow channel members 70, 72, and 74 include tracks 76, 78, and 80, respectively, formed in radially outer surfaces thereof. Tracks 76, 78, and 80 are sometimes referred to as "inertia tracks" or "flow channels". As illustrated, tracks 76, 78, and 80 are helical, but other geometries could be utilized. Tracks 76, 78, and 80 each have a cross-sectional area and a length that defines a different volume for each track. A larger track volume results in a larger volume and a larger mass of fluid oscillating in the track during vibration transmitted from the vehicle frame VF to the vehicle body VB during operation of the vehicle, and hence more damping. A smaller track volume results in a smaller volume and a smaller mass of fluid oscillating in the track during vibration transmitted from the vehicle frame VF to the vehicle body VB during operation of the vehicle, and hence less damping. As illustrated, the tracks 76, 78, and 80 have a truncated "V" shape in cross-section (to assist in mold removal) which in the industry is nevertheless referred to as a "square" cross-section, but other cross-sectional geometries could be used for the tracks in the practice of the present invention such as round, etc.

By utilizing more or less standard or universal mount components such as the outer housing 20, an inner sleeve 30, inner bushing 32, main spring assembly 40, and bottom compliance assembly 60, along with plurality of flow channel members 70, 72, and 74, each of which has a different inertia track or flow channel volume, the mount 10 can be tuned to provide a selected dynamic performance of the mount 10. Two parameters that describe the dynamic performance of a hydraulic damping vibration mount are dynamic stiffness and loss angle, as measured in a vertical direction (axial direction of mount).

The dynamic stiffness of a vibration damping mount is simply force per unit amplitude, as a function of vibration frequency.

The loss angle of a vibration damping mount, sometimes referred to as "tan delta", "tangent of delta", or "loss factor", quantifies the way in which the mount absorbs and disperses energy. It expresses the out-of-phase time relationship between a force applied to the mount and the resultant force that is transmitted to the object supported on the mount. Thus, the loss angle is an indication of the effectiveness of the mount's damping capabilities. The higher the loss angle, the greater the damping coefficient, and thus the more efficient the mount is in effectively accomplishing energy absorption and dispersal.

One application of the mount of the present invention is in passenger pickup trucks. The preferred vertical natural frequency of the vehicle frame and vehicle body of a typical passenger pickup truck ranges from about 12 Hz to about 18 Hz. The tunable mount 10 allows the dynamic stiffness and loss angle to be varied over this frequency range simply by choosing a different flow channel member having a different inertia track or flow channel volume. For this particular application, the maximum dynamic stiffness preferably ranges from about 3,000 N/mm to about 3,200 N/mm over the frequency range of about 12 Hz to about 18 Hz, and the maximum loss angle preferably ranges from about 100 degrees to about 110 degrees over the frequency range of about 12 Hz to about 18 Hz.

The flow channel members can be molded. Different flow channel volumes can be obtained simply by using a basic mold, in conjunction with different mold inserts, each insert providing a different depth of the inertia track or flow channel, and thus a different volume, for each molded flow channel member. Thus, an economical tunable hydraulic vibration damping mount can be produced with standard or universal mount components along with several flow channel members, a selected one of which can be assembled with the standard or universal mount components depending on the desired dynamic performance of the mount. The flow channel members could also be 3-D printed.

Figure 7:
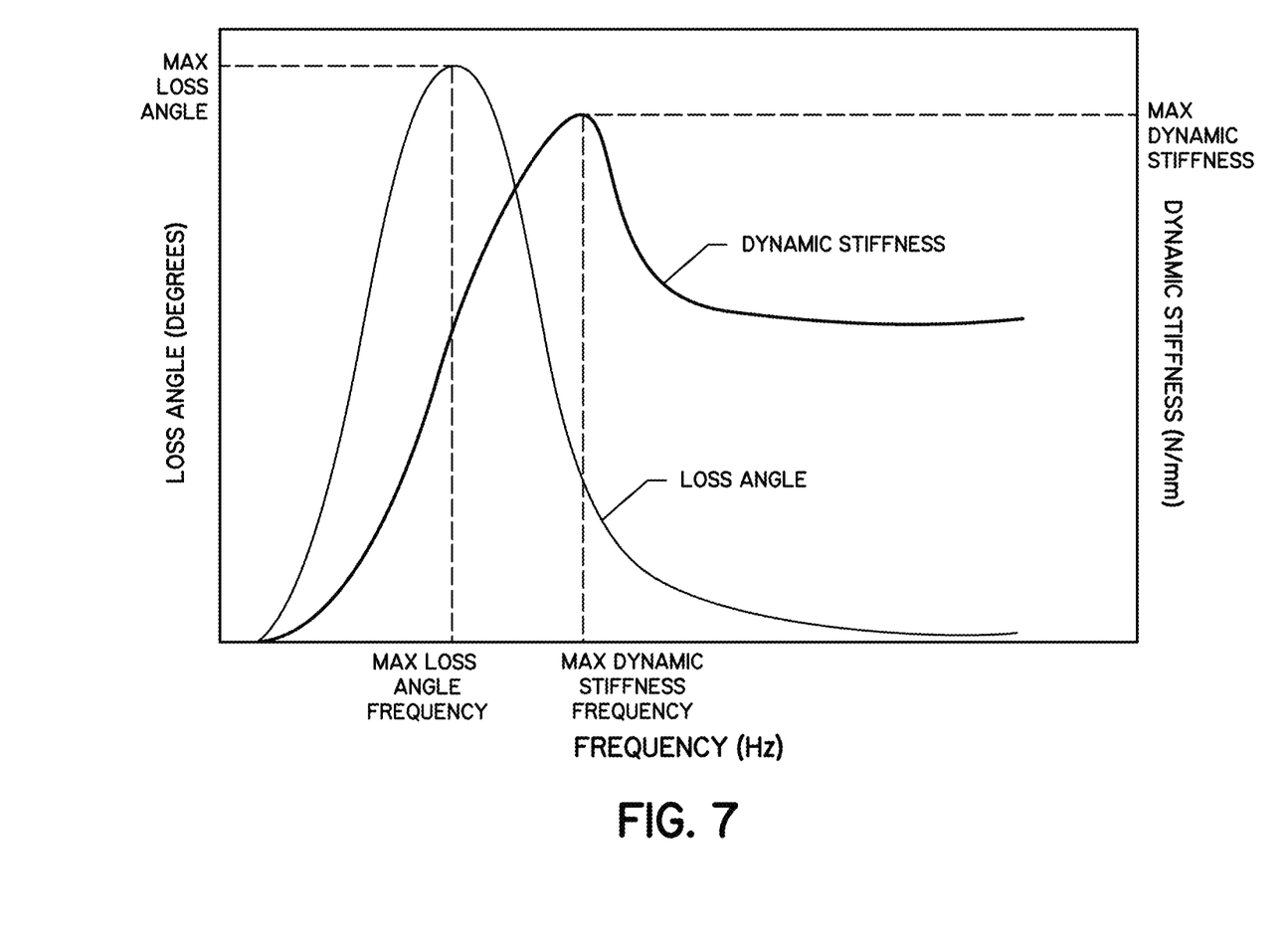
FIG. 7 is a curve of dynamic stiffness as a function of frequency and loss angle as a function of frequency.

Referring to FIG. 7, a curve of dynamic stiffness as a function of frequency and a curve of loss angle as a function of frequency is illustrated. As shown, the maximum dynamic stiffness occurs at a maximum dynamic stiffness frequency, and the maximum loss angle occurs at a maximum loss angle frequency. By assembling different ones of the flow channel members with the standard or universal mount components described above, the maximum dynamic stiffness can be shifted up or down and/or left or right, as desired. Similarly, the maximum loss angle can be shifted up or down and/or left or right, as desired.

To assemble the mount 10, the upper end of the inner sleeve 30 (with bushing 32 molded thereon) is pressed into the main spring assembly 40. The inner sleeve 30 and main spring assembly 40 are affixed to the outer housing 20, as by riveting the bottom plate 48 of the main spring assembly 40 to the flange 24 of the outer housing 20. The seal 71 is pressed into the outer housing 20 so that its upper end abuts the return 26 of the outer housing 20. The selected flow channel member 70, 72, or 74 is pressed into the outer housing 20 until its upper end abuts the lower end of the seal 71. The bottom compliance assembly 60 is pressed onto the lower end of the inner sleeve 30. The lower end of the outer housing 20 is swedged to the bottom compliance assembly 60. The mount 10 is filled with glycol or other acceptable fluid via the port 46 in the main spring assembly 40. The upper washer 54 is pressed onto the upper end of the inner sleeve 30, and the lower washer 68 is pressed onto the lower end of the inner sleeve 30.

The vibration damping mount of the present invention provides a number of advantages. First, a tunable vibration damping mount is provided that provides for a selectable dynamic performance range within a standard or universal physical envelope of the mount. This is accomplished by utilizing standard or universal components such as the outer housing, inner sleeve, main spring assembly, bottom compliance assembly, and inner bushing, along with several different fluid flow channel members, each of which has a track, for example helical track, defining a different volume. To tune the damping mount, one selects the flow channel member (with corresponding track volume) that yields the desired dynamic performance of the damping mount, and assembles it with the rest of the standard or universal components.

Second, the static in-plane fore-and-aft and side-to-side performance of the vibration damping mount can be tuned via the rubber geometry and the rubber hardness of the inner bushing.

Third, the vibration damping mount of the present invention is easier to install than the commercially available mount of U.S. Pat. Nos. 8,091,871, 9,038,997, and 9,765,845. This is because the mount of the present invention is of a one-piece construction, which allows it to simply be dropped from above down into a hole in the vehicle frame and secured to the frame with fasteners. This is in contrast to the two-piece design of the commercially available mount of U.S. Pat. Nos. 8,091,871, 9,038,997, and 9,765,845, which requires the lower portion of the mount to be positioned below the frame, the upper portion of the mount to be positioned above the mount, and the two mount portions to be secured together and to the frame with fasteners.

Fourth, the vibration damping mount of the present invention exhibits size and weight savings over the commercially available mount of U.S. Pat. Nos. 8,091,871, 9,038,997, and 9,765,845 for a similar application. For example, the mount of the present invention for one particular application has an overall height of 127 mm, a main body diameter of 64 mm, and a mass of 1376 g. In contrast, the commercially available mount of U.S. Pat. Nos. 8,091,871, 9,038,997, and 9,765,845 for the same application has an overall height of 134 mm, a main body diameter of 89 mm, and a mass of 1633 g. Using four mounts of the present invention to mount the body to the frame results in a total weight savings of 514 g (1.1 lb) versus the commercially available mount of U.S. Pat. Nos. 8,091,871, 9,038,997, and 9,765,845.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. The invention resides in each individual feature described herein, alone, and in all combinations of any and all of those features. Departures may therefore be made from such details without departing from the spirit or scope of the general inventive concept. Accordingly, the scope of the invention shall be limited only by the following claims and their equivalents.

What is claimed is:

1. A tunable hydraulic vibration damping mount comprising:
    a universal outer housing,
    a universal inner sleeve,
    a universal main spring assembly positioned at an upper end of said outer housing for pumping fluid through said mount,
    a universal bottom compliance assembly positioned at a lower end of said outer housing for allowing expansion during fluid flow when said main spring assembly is compressed,
    a universal inner bushing extending radially outwardly from said inner sleeve, and
    a plurality of fluid flow channel members, each of said plurality of flow channel members comprising a cylinder having a common inner diameter, a common outer diameter, and a helical track formed therein having a cross-sectional area and a length defining a volume of said helical track, each said helical track of each of said plurality of flow channel members defining a different said volume,
    a selected one of said plurality of flow channel members positioned between said inner bushing and said outer housing and between said main spring assembly and said bottom compliance assembly, said selected flow channel member providing a selected dynamic performance of said damping mount.

2. The damping mount of claim 1 wherein the selected dynamic performance is based upon a maximum dynamic stiffness at a maximum dynamic stiffness frequency and a maximum loss angle at a maximum loss angle frequency.

3. The damping mount of claim 2 wherein the maximum dynamic stiffness ranges from about 3,000 N/mm to about 3,200 N/mm at a frequency range of about 12 Hz to about 18 Hz, and wherein the maximum loss angle ranges from about 100 degrees to about 110 degrees at a frequency range of about 12 Hz to about 18 Hz.

4. The damping mount of claim 1 wherein said inner sleeve is fabricated of steel and said inner bushing is fabricated of rubber and is molded to said inner sleeve.

5. The damping mount of claim 4 wherein said inner bushing includes one or more thinner or thicker sections, a durometer of said rubber and a geometry of said thinner or thicker sections selected so as to provide selected fore-and-aft and side-to-side radial stiffnesses of said damping mount.

6. The damping mount of claim 5 wherein said inner bushing includes an outer plastic sleeve, said inner bushing molded to said outer plastic sleeve, a radial outer surface of said outer plastic sleeve abutting a radial inner surface of said selected flow channel member.

7. The damping mount of claim 1 further including a rubber seal positioned at an upper end of said selected flow channel member to seal said selected flow channel member and permit fluid flow from a reservoir of said main spring assembly to said helical track of said selected flow channel member.

8. The damping mount of claim 1 further including an upper washer positioned at an upper end of said inner sleeve.

9. The damping mount of claim 8 wherein said upper washer is fabricated of steel.

10. The damping mount of claim 1 further including a lower washer positioned at a lower end of said inner sleeve.

11. The damping mount of claim 10 wherein said lower washer is fabricated of steel.

12. The damping mount of claim 1 wherein said main spring assembly comprises an inner die cast aluminum member, a steel bottom plate, and a rubber body molded to said aluminum member and said bottom plate.

13. The damping mount of claim 12 wherein said outer housing is fabricated of steel and comprises a cylinder having a flange at an upper end of said cylinder, said bottom plate abutting said flange, said flange and bottom plate having aligned holes therethrough, and fasteners pressed into said holes and adapted to secure said damping mount to a vehicle frame.

14. The damping mount of claim 1 wherein said plurality of flow channel members are fabricated of nylon.

15. The damping mount of claim 1 wherein said bottom compliance assembly comprises an inner plastic sleeve, an outer steel flange, and a rubber bellows molded to said inner plastic sleeve and said outer steel flange.

16. A method of tuning a hydraulic vibration damping mount comprising:
    providing a universal outer housing,
    providing a universal inner sleeve,
    providing a universal main spring assembly,
    providing a universal bottom compliance assembly,
    providing a universal inner bushing, and
    providing a plurality of fluid flow channel members, each of the plurality of flow channel members comprising a cylinder having a common inner diameter, a common outer diameter, and a helical track formed therein having a cross-sectional area and a length defining a volume of the helical track, each helical track of each of the plurality of flow channel members defining a different volume, selecting a flow channel member from the plurality of flow channel members that provides a selected dynamic performance of the damping mount, and assembling the outer housing, inner sleeve, main spring assembly, bottom compliance assembly, inner bushing, and selected flow channel member by positioning the universal main spring assembly at an upper end of the outer housing for pumping fluid through the mount, positioning the universal bottom compliance assembly at a lower end of the outer housing for allowing expansion during fluid flow when the main spring assembly is compressed, positioning the universal inner bushing so as to extend radially outwardly from the inner sleeve, and positioning the selected flow channel member between the inner bushing and the outer housing and between the main spring assembly and the bottom compliance assembly.

17. The method of claim 16 wherein the selected dynamic performance is based upon a maximum dynamic stiffness at a maximum dynamic stiffness frequency and a maximum loss angle at a maximum loss angle frequency.

18. The method of claim 17 wherein the maximum dynamic stiffness ranges from about 3,000 N/mm to about 3,200 N/mm at a frequency range of about 12 Hz to about 18 Hz, and wherein the maximum loss angle ranges from about 100 degrees to about 110 degrees at a frequency range of about 12 Hz to about 18 Hz.

19. A method of tuning a hydraulic vibration damping mount comprising:
providing a universal outer housing,
providing a universal inner sleeve,
providing a universal main spring assembly,
providing a universal bottom compliance assembly,
providing a universal inner bushing, and
providing a plurality of fluid flow channel members, each of the plurality of flow channel members comprising a cylinder having a common inner diameter, a common outer diameter, and a helical track formed therein having a cross-sectional area and a length defining a volume of the helical track, each helical track of each of the plurality of flow channel members defining a different volume, selecting a flow channel member from the plurality of flow channel members that provides a selected dynamic performance of the damping mount, and assembling the outer housing, inner sleeve, main spring assembly, bottom compliance assembly, inner bushing, and selected flow channel member, wherein the step of assembling the outer housing, inner sleeve, main spring assembly, bottom compliance assembly, inner bushing, and selected flow channel member comprises:

molding the inner bushing on the inner sleeve,
pressing an upper end of the inner sleeve into the main spring assembly,
affixing the inner sleeve and the main spring assembly to the outer housing,
pressing a seal into the outer housing,
pressing the selected flow channel member into the outer housing below the seal,
pressing the bottom compliance assembly onto a lower end of the inner sleeve,
swedging a lower end of the outer housing to the bottom compliance assembly,
filling the damping mount through a port in the main spring assembly with fluid,
pressing an upper washer onto the upper end of the inner sleeve,
pressing a lower washer onto the lower end of the inner sleeve, and
pressing fasteners through aligned holes in a bottom plate of the main spring assembly and in an upper flange of the inner sleeve.

20. A tunable hydraulic vibration damping mount comprising:
an outer housing,
an inner sleeve,
a main spring assembly positioned at an upper end of said outer housing for pumping fluid through said mount,
a bottom compliance assembly positioned at a lower end of said outer housing for allowing expansion during fluid flow when said main spring assembly is compressed,
a inner bushing extending radially outwardly from said inner sleeve, and
a plurality of fluid flow channel members, each of said plurality of flow channel members comprising a cylinder having a common inner diameter, a common outer diameter, and a track formed therein having a cross-sectional area and a length defining a volume of said track, each said track of each of said plurality of flow channel members defining a different said volume,
a selected one of said plurality of flow channel members positioned between said inner bushing and said outer housing and between said main spring assembly and said bottom compliance assembly, said selected flow channel member providing a selected dynamic performance of said damping mount.

21. The damping mount of claim 20 wherein the selected dynamic performance is based upon a dynamic stiffness and a loss angle.

22. The damping mount of claim 20 wherein said track is helical.

* * * * *